(12) United States Patent
Zhang et al.

(10) Patent No.: US 11,323,007 B2
(45) Date of Patent: May 3, 2022

(54) MAGNETIC LEVITATION BEARING, MAGNETIC LEVITATION ROTOR SUPPORT ASSEMBLY, AND COMPRESSOR

(71) Applicant: GREE GREEN REFRIGERATION TECHNOLOGY CENTER CO., LTD. OF ZHUHAI, Zhuhai (CN)

(72) Inventors: Xiaobo Zhang, Zhuhai (CN); Gao Gong, Zhuhai (CN); Yusheng Hu, Zhuhai (CN); Jianning Liu, Zhuhai (CN); Fang Zhang, Zhuhai (CN); Siyuan Tian, Zhuhai (CN); Chao Zhang, Zhuhai (CN); Jiuzhan Su, Zhuhai (CN); Xin Li, Zhuhai (CN)

(73) Assignee: GREE GREEN REFRIGERATION TECHNOLOGY CENTER CO., LTD. OF ZHUHAI, Zhuhai (CN)

( * ) Notice: Subject to any disclaimer, the term of this patent is extended or adjusted under 35 U.S.C. 154(b) by 185 days.

(21) Appl. No.: 16/652,459

(22) PCT Filed: Oct. 29, 2018

(86) PCT No.: PCT/CN2018/112312
§ 371 (c)(1),
(2) Date: Mar. 31, 2020

(87) PCT Pub. No.: WO2019/119973
PCT Pub. Date: Jun. 27, 2019

(65) Prior Publication Data
US 2020/0235635 A1     Jul. 23, 2020

(30) Foreign Application Priority Data

Dec. 21, 2017 (CN) .......................... 201711390234.1

(51) Int. Cl.
*H02K 7/09* (2006.01)
*F16C 32/04* (2006.01)
(Continued)

(52) U.S. Cl.
CPC ........... *H02K 7/09* (2013.01); *F16C 32/0465* (2013.01); *F04D 29/051* (2013.01);
(Continued)

(58) Field of Classification Search
CPC ................... H02K 7/09; F16C 32/0465; F16C 2360/44; F16C 2380/26; F16C 32/0485; F04D 29/051; F04D 29/058
(Continued)

(56) References Cited

U.S. PATENT DOCUMENTS 5,315,197 A * 5/1994 Meeks ................ F16C 32/0476
310/90.5
5,514,924 A * 5/1996 McMullen .......... F16C 32/0465
310/90.5
(Continued)

FOREIGN PATENT DOCUMENTS

CN    101235848 A    8/2008
CN    102684365 A    9/2012
(Continued)

OTHER PUBLICATIONS

International Search Report dated Jan. 18, 2019 in corresponding International application No. PCT/CN2018/112312; 6pages.
Decision of Refusal dated Nov. 12, 2021, in connection with corresponding Chinese Application No. 201780051879.4 (12 pp., including machine-generated English translation).
(Continued)

*Primary Examiner* — Ahmed Elnakib
(74) *Attorney, Agent, or Firm* — Maier & Maier, PLLC

(57) ABSTRACT

A magnetic levitation bearing, a magnetic levitation rotor support assembly, and a compressor. The magnetic levitation
(Continued)

bearing is used for supporting a rotor by interacting with a thrust disc on the rotor, and comprises: a radial stator core having an annular structure, which is disposed on a radial outer side of the thrust disc and corresponds to the thrust disc in an axial direction of the rotor, the radial stator core and the thrust disc being separated by a first radial gap X1; and a radial control coil, which is disposed on the radial stator core and can generate a radial electromagnetic force to the thrust disc in a radial direction of the rotor.

13 Claims, 3 Drawing Sheets

(51) Int. Cl.
*F04D 29/051* (2006.01)
*F04D 29/058* (2006.01)

(52) U.S. Cl.
CPC ........ *F04D 29/058* (2013.01); *F16C 2360/44* (2013.01); *F16C 2380/26* (2013.01)

(58) Field of Classification Search
USPC ........................................ 310/90.5
See application file for complete search history.

(56) References Cited

U.S. PATENT DOCUMENTS

| | | | |
|---|---|---|---|
| 8,482,174 B2* | 7/2013 | Filatov | H02K 7/09 |
| | | | 310/90.5 |
| 9,157,447 B2 | 10/2015 | Freeman et al. | |
| 2014/0167543 A1 | 6/2014 | Upadhyay | |

FOREIGN PATENT DOCUMENTS

| | | |
|---|---|---|
| CN | 102305242 B | 3/2013 |
| CN | 105650117 A | 6/2016 |
| CN | 105814093 A | 7/2016 |
| CN | 107165936 A | 9/2017 |
| CN | 108087321 A | 5/2018 |
| CN | 207848018 U | 9/2018 |
| JP | H07243444 A | 9/1995 |
| JP | 2007262243 A | 10/2007 |
| JP | 2016169809 A | 9/2016 |
| KR | 2010136252 | * 12/2010 |

OTHER PUBLICATIONS

Extended European Search Report dated Oct. 23, 2020, in connection with corresponding European Application No. 18893018.4; 7pages.

\* cited by examiner

MAGNETIC LEVITATION BEARING, MAGNETIC LEVITATION ROTOR SUPPORT ASSEMBLY, AND COMPRESSOR

The present application claims the priority to the Chinese Patent Application No. 201711390234.1, filed to the Chinese Patent Office on Dec. 21, 2017 and entitled "Magnetic Levitation Bearing, Magnetic Levitation Rotor Support Assembly, and Compressor", which is incorporated herein by reference in its entirety.

TECHNICAL FIELD

The present invention belongs to the field of a magnetic levitation technology, and more particularly, relates to a magnetic levitation bearing, a magnetic levitation rotor support assembly, and a compressor.

BACKGROUND ART

During the working in a magnetic levitation bearing of the prior art, axial and radial bias magnetic circuits are provided by a permanent magnet magnetic circuit so as to provide certain radial and axial forces to a thrust disc. When a control magnetic circuit controls a coil to introduce currents in positive and negative directions, the change in a superposition effect of the control magnetic circuit and the permanent magnet bias magnetic circuit in the axial direction can be adjusted, so that the change in the force applied to the thrust disc in the axial direction is adjusted, and the effect of controlling the axial force applied to the thrust disc is achieved.

However, for horizontal magnetic levitation turbine machinery, it is generally necessary to overcome the effect of gravity and the effect of a centrifugal force in a vertical plane. Therefore, the force applied to a rotor of the horizontal magnetic levitation turbine machinery in the radial direction needs to be adjustable. However, in the prior art, the force applied to the magnetic levitation bearing in the radial direction of the rotor cannot be adjusted, thereby causing a relatively low design flexibility and a relatively small application range of the bearing. In addition, a general centrifugal compressor experiences a backward axial force which is relatively large, during operation and shutdown of the compressor. Such axial force adversely affects the stability of the rotor, and thus the structural strength and service life of the rotor.

Due to the problem in the prior art that the force applied on the magnetic levitation bearing in the radial direction of the rotor cannot be adjusted, the bearing has a relatively low design flexibility and a relatively small application range. Besides, a large backward axial force occurs during the operation and shutdown of the compressor, and such axial force adversely affects the stability of the rotor, and thus the structural strength and the service life of the rotor. Therefore, the present invention is made to research and develop a magnetic levitation bearing, a magnetic levitation rotor support assembly and a compressor.

SUMMARY OF THE INVENTION

Therefore, the technical problem to be solved by the present invention is to overcome the drawbacks in the prior art that the force applied to the rotor of the magnetic levitation bearing in the radial direction cannot be adjusted or accurately adjusted, resulting in a relatively low design flexibility and a relatively small application range of the bearing. Therefore, a magnetic levitation bearing, a magnetic levitation rotor support assembly and a compressor are provided.

The present invention provides a magnetic levitation bearing for supporting a rotor by interacting with a thrust disc on the rotor, comprising:

a radial stator core having an annular structure, which is disposed on a radial outer side of the thrust disc and corresponds to the thrust disc in an axial direction of the rotor, the radial stator core and the thrust disc being separated by a first radial gap X1; and a radial control coil, which is disposed on the radial stator core and can generate a radial electromagnetic force to the thrust disc in a radial direction of the rotor.

Preferably, the magnetic levitation bearing further comprises more than two through grooves, which are formed on the radial stator core and located in a position between a radial inner side and the radial outer side of the radial stator core, wherein the through grooves pass through the radial stator core in the axial direction, every two adjacent through grooves form a through groove pair, and a magnetic pole to be wound by the radial control coil is formed between the two through grooves in one of the through groove pairs.

Preferably, the two adjacent through grooves in one of the through groove pairs are arranged in a circumferential direction of the radial stator core, so that a length direction of the magnetic pole extends toward a radial direction of the radial stator core; and the radial control coil is wound around the magnetic pole, so that a surrounding axis of the radial control coil is in the radial direction of the radial stator core.

Preferably, a plurality of the magnetic poles are disposed and evenly distributed in the circumferential direction of the radial stator core, and each magnetic pole is wound by one radial control coil.

Preferably, four magnetic poles are disposed, and every two adjacent magnetic poles are separated by a circumferential angle of 90° in the circumferential direction of the radial stator core.

Preferably, the magnetic levitation bearing further comprises a permanent magnet, which is disposed on the radial outer side of the radial stator core and corresponds to the axial position of the radial stator core; and a second stator core, which can extend from the radial outer side of the permanent magnet to a position close to the thrust disc, so that a permanent magnet force in the axial direction of the rotor and/or in the radial direction of the rotor is generated to the thrust disc.

Preferably, the second stator core comprises a front stator core:

the front stator core comprises a first axial extending portion, a first radial extending portion, and a second axial extending portion;

one end of the first axial extending portion is located on the radial outer side of the permanent magnet, and the other end of the first axial extending portion extends in the axial direction of the rotor;

one end of the first radial extending portion is connected to the other end of the first axial extending portion, and the other end of the first radial extending portion extends in the radial direction of the rotor; and one end of the second axial extending portion is connected to the other end of the first radial extending portion, the other end of the second axial extending portion extends to a position close to the thrust disc in the axial direction of the rotor, and the other end of the second axial extending portion and the thrust disc are separated by a first axial gap X2 in the axial direction of the rotor.

Preferably, the second stator core comprises a rear stator core:

the rear stator core comprises a third axial extending portion, a second radial extending portion, and a fourth axial extending portion;

one end of the third axial extending portion is located on the radial outer side of the permanent magnet, and the other end of the third axial extending portion extends in the axial direction of the rotor;

one end of the second radial extending portion is connected to the other end of the third axial extending portion, and the other end of the second radial extending portion extends in the radial direction of the rotor; and one end of the fourth axial extending portion is connected to the other end of the second radial extending portion, the other end of the fourth axial extending portion extends to a position close to the thrust disc in the axial direction of the rotor, and the other end of the fourth axial extending portion and the thrust disc are separated by a second axial gap X3 in the axial direction.

Preferably, the second stator core comprises a rear stator core:

the rear stator core comprises a third axial extending portion and a second radial extending portion;

one end of the third axial extending portion is located on the radial outer side of the permanent magnet, and the other end of the third axial extending portion extends in the axial direction of the rotor;

one end of the second radial extending portion is connected to the other end of the third axial extending portion, and the other end of the second radial extending portion extends in the radial direction of the rotor;

the second stator core further comprises a rotor retaining ring disposed on a position on the axial side of the thrust disc and close to the second radial extending portion, and the rotor retaining ring is fixedly connected to the rotor; and the other end of the second radial extending portion extends to a position close to the rotor retaining ring in the radial direction of the rotor, and the other end of the second radial extending portion and the rotor retaining ring are separated by a second radial gap X3' in the radial direction.

Preferably, when the magnetic levitation bearing comprises both the front stator core and the rear stator core, the front stator core is connected to the rear stator core at a position on the radial outer side of the permanent magnet, so that magnetic field can be continuously conducted at the connection position.

Preferably, the connection position is located on the radial outer side of the permanent magnet, and is opposite to an axial end face of the permanent magnet in the axial direction of the rotor.

The present invention further provides a magnetic levitation rotor support assembly, comprising a rotor and any one of the preceding magnetic levitation bearings, wherein the magnetic levitation bearing can support the rotor.

Preferably, the rotor comprises a smooth shaft and a thrust disc fixedly connected to the radial outer side of the smooth shaft, and an axial and/or radial magnetic force can be generated between the magnetic levitation bearing and the thrust disc to support the rotor.

The present invention further provides a compressor, comprising any one of the preceding magnetic levitation rotor support assemblies.

The magnetic levitation bearing, the magnetic levitation rotor supporting assembly and the compressor provided by the present invention have the following beneficial effects.

1. According to the magnetic levitation bearing, the magnetic levitation rotor support assembly and the compressor of the present invention, the radial stator core has the annular structure, is disposed on the radial outer side of the thrust disc, and corresponds to the thrust disc in the axial direction of the rotor. The radial stator core and the thrust disc are separated by the first radial gap X1. The radial control coil is disposed on the radial stator core and can generate a radial electromagnetic force to the thrust disc in the radial direction of the rotor. The controllable and adjustable radial electromagnetic force to the thrust disc is generated in the radial direction of the rotor, so that the flexibility of the bearing can be designed to be larger, and the application range of the bearing is effectively expanded. Different from the axial force adjustment in the prior art, the radial force applied to the bearing can be adjusted. Therefore, the magnetic levitation bearing can be applied to more horizontal turbine machinery, thereby expanding the application range of such type of bearings.

2. According to the magnetic levitation bearing, the magnetic levitation rotor support assembly and the compressor of the present invention, since a general centrifugal compressor will experience a backward axial force, which is relatively large, during the operation and shutdown of the compressor, in order to weaken or even offset the adverse effect of such action force on the stability of the rotor, by disposing the rotor retaining ring and the rear stator core matched therewith, the original axial force generated to the thrust disc can be eliminated, and instead, a radial force is generated to the rotor retaining ring, and then converted into the radial force acting on the rotor. The action of the axial force of the air gap X3 is eliminated, so that the axial force generated by the front stator core can be used to offset the axial force of the compressor. Instead, the radial force provided by the air gap X3' is applied to the centrifugal compressor, thereby further reducing the working current of the magnetic levitation bearing, reducing the losses, reducing the operating cost of the compressor, and improving the product competitiveness.

Figure 1:
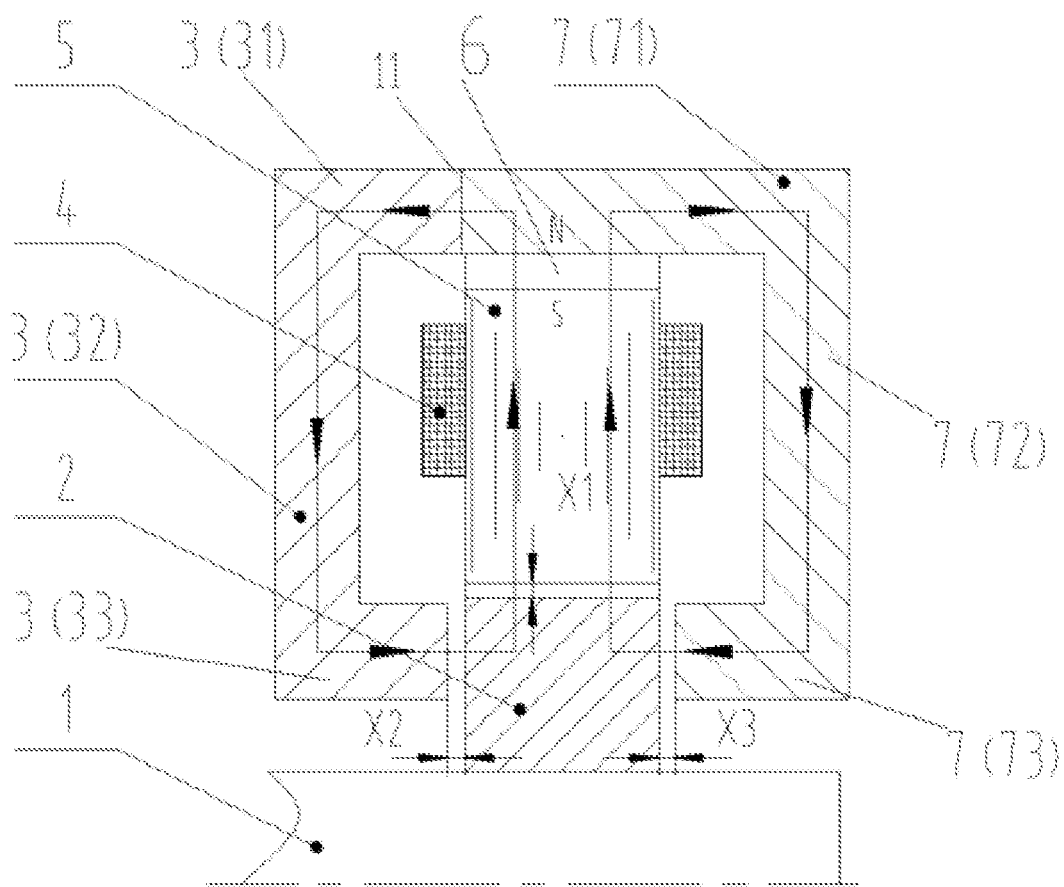
FIG. 1 is an internal structural diagram in a longitudinal section of a magnetic levitation bearing according to Embodiment 1 of the present invention.

The reference signs in the drawings denote the following components:

1, smooth shaft; 2, thrust disc; 3, front stator core; 31, first axial extending portion; 32, first radial extending portion; 33, second axial extending portion; 4, radial control coil; 5, radial stator core; 6, permanent magnet; 7, rear stator core; 71, third axial extending portion; 72, second radial extending portion; 73, fourth axial extending portion; 8, rotor retaining ring; 9, through groove; 10, magnetic pole; 11, connection position.

DETAILED DESCRIPTION OF THE EMBODIMENTS

"———▶———" in FIGS. 1-4 indicates a bias magnetic circuit (that is, the magnetic circuit generated by a permanent magnet), and "———▶———" therein indicates a control magnetic circuit (that is, the magnetic circuit generated by a current coil).

Embodiment 1

Figure 2:
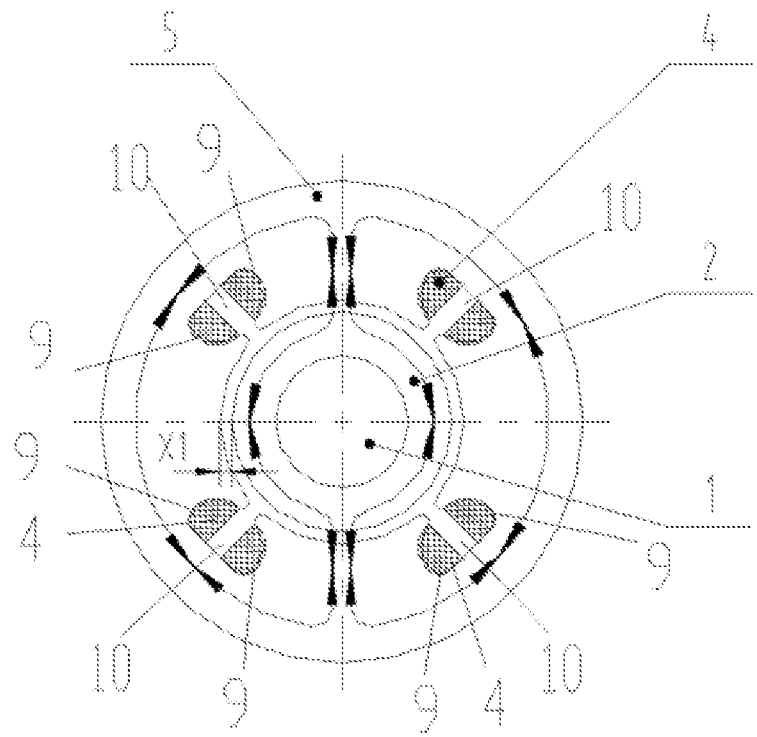
FIG. 2 is a structural diagram of the magnetic levitation bearing, viewed in the axial direction of a rotor, according to Embodiment 1 of the present invention.

As shown in FIGS. 1-2, the present invention provides a magnetic levitation bearing, which is configured to support a rotor by interacting with a thrust disc 2 on the rotor, and comprises a radial stator core 5 and a radial control coil 4.

The magnetic levitation bearing of the present invention is disposed on the radial outer side of the thrust disc 2 of the rotor. The rotor comprises a smooth shaft 1 and the thrust disc 2 fixedly connected to the radial outer peripheral surface of the smooth shaft 1.

The radial stator core 5 has an annular structure, is disposed on the radial outer side of the thrust disc 2 and corresponds to the thrust disc 2 in the axial direction of the rotor. The radial stator core 5 and the thrust disc 2 are separated by a first radial gap X1.

The radial control coil 4 is disposed on the radial stator core 5 and can generate a radial electromagnetic force to the thrust disc 2 in a radial direction of the rotor.

The radial stator core has the annular structure, is disposed on the radial outer side of the thrust disc, and corresponds to the thrust disc in the axial direction of the rotor. The radial stator core and the thrust disc are separated by the first radial gap X1. The radial control coil is disposed on the radial stator core and can generate the radial electromagnetic force to the thrust disc in the radial direction of the rotor. The electromagnetic magnetic circuit generated by the radial control coil is as shown in FIG. 2 and is indicated by "———▶———". The electromagnetic magnetic circuit surrounds the coil from the radial outer side of the coil, then passes through the radial stator core in the radial direction, through the first radial gap X1, and into the thrust disc 2 in the radial direction. After circumferentially surrounding for a part of arc length in the thrust disc 2, the electromagnetic magnetic circuit passes through the first radial gap X1 in the radial direction and into the radial stator core 5, so that the loop-shaped electromagnetic magnetic circuit as shown in FIG. 2 is formed, thereby forming the electromagnetic force (i.e., a control force) to the thrust disc in the radial direction. The controllable and adjustable radial electromagnetic force to the thrust disc can be generated in the radial direction of the rotor, such that the flexibility of the bearing can be designed to be larger, and the application range of the bearing is effectively expanded. Different from the axial force adjustment in the prior art, the radial force applied to the bearing can be adjusted. Therefore, the magnetic levitation bearing can be applied to more horizontal turbine machinery, thereby expanding the application range of such type of bearings.

Preferably, the magnetic levitation bearing further comprises more than two through grooves 9 which are formed on the radial stator core 5 and located in a position between the radial inner side and the radial outer side of the radial stator core.

The through grooves 9 pass through the radial stator core 5 in the axial direction. Every two adjacent through grooves 9 form a through groove pair, and a magnetic pole 10 to be wound by the radial control coil 4 is formed between the two through grooves 9 in one of the through groove pairs.

The above is an arrangement manner that the magnetic pole to be wound by the coil to provide the electromagnetic force in a radial direction is formed in the magnetic levitation bearing according to the present invention. By forming the through grooves, an intermediate connecting portion (i.e., the magnetic pole) and hollow portions (i.e., the through grooves) on both sides as shown in FIG. 2 are formed on a panel of the radial stator core, so that the coil can be passed into the through groove on one side and out of the through groove on the other side, thereby forming a coil group surrounding the intermediate connecting portion (i.e., the magnetic pole), and further generating the electromagnetic force action in the radial direction.

Preferably, in one of the through groove pairs, the two adjacent through grooves 9 are arranged in a circumferential direction of the radial stator core 5, so that the length direction of the magnetic pole 10 extends toward the radial direction of the radial stator core 5. The radial control coil 4 is wound around the magnetic pole 10, so that the surrounding axis of the radial control coil 4 runs in the radial direction of the radial stator core 5.

Since the coil is wound around the magnetic pole, the length direction of the magnetic pole is set in the radial direction of the radial stator core, so that the surrounding axis of the coil also runs in the radial direction of the stator core, thereby effectively generating the electromagnetic force acting on the thrust disc in the radial direction. Compared with the coil winding manner in the background art (the coil is wound around a rotation axis direction, so that the formed electromagnetic force is in the axial direction of the rotor), the adjustable electromagnetic force (i.e., a control magnetic force) can be formed in the radial direction of the rotor, so that the safety and reliability of the bearing can be increased, and the application range is wider.

Preferably, a plurality of magnetic poles 10 are disposed and evenly distributed in the circumferential direction of the radial stator core 5, and each magnetic pole 10 is wound by one radial control coil 4. The above is the preferred number and arrangement manner of the magnetic poles in the present invention. The magnetic poles are evenly distributed in the circumferential direction of the stator core, and the electromagnetic force action in the radial direction can be generated at different positions in the circumferential direction, thereby increasing the magnitude of the radial electromagnetic force. The action force of the radial electromagnetic force is enhanced and uniformized.

Figure 4:
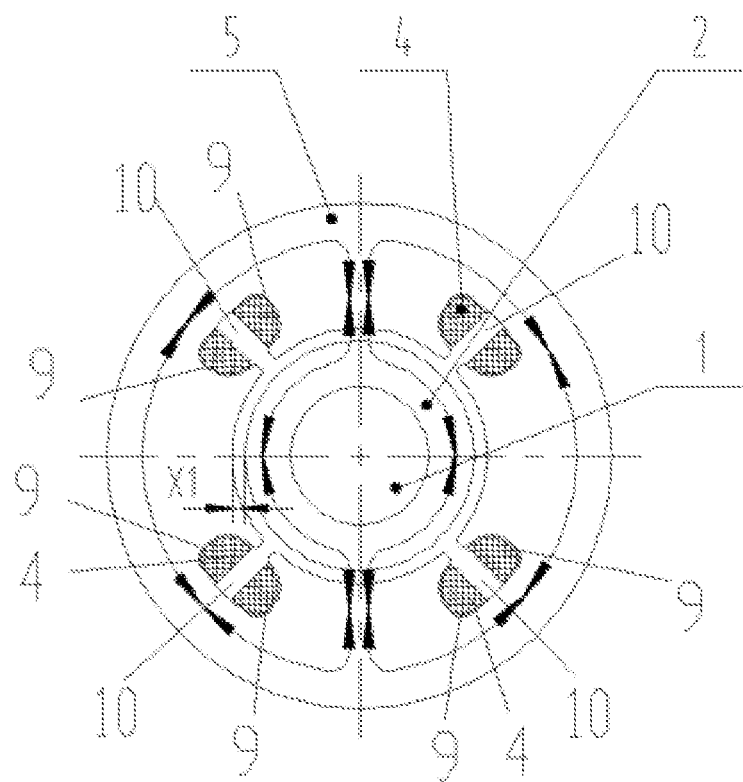
FIG. 4 is a structural diagram of the magnetic levitation bearing, viewed in the axial direction of the rotor, according to Embodiment 2 of the present invention.

Preferably, four magnetic poles 10 are disposed, and two adjacent magnetic poles 10 are separated by a circumferential angle of 90° in the circumferential direction of the radial stator core 5. The above is a further preferred number and arrangement manner of the magnetic poles in the present invention. As shown in FIGS. 2 and 4, the magnetic poles are evenly distributed in the circumferential direction, and the four magnetic poles generate four controllable electromagnetic forces in the radial direction respectively. Compared with one magnetic pole and one group of coils, the electromagnetic force of the four magnetic poles is increased by 4 times, and the effect of the controllable electromagnetic force is effectively improved.

Preferably, the magnetic levitation bearing further comprises a permanent magnet 6. The permanent magnet 6 is disposed on the radial outer side of the radial stator core 5 and corresponds to the axial position of the radial stator core 5.

The magnetic levitation bearing further comprises a second stator core, which can extend from the radial outer side of the permanent magnet 6 to a position close to the thrust disc 2, so that a permanent magnet force in the axial direction of the rotor and/or in the radial direction of the rotor is generated to the thrust disc 2.

The above is a further preferred structural form of the magnetic levitation bearing of the present invention. By disposing the permanent magnet and the second stator core, on the basis that the electromagnetic coil generates the radial electromagnetic force, a bias force (i.e., the permanent magnet force) in the axial direction and/or the radial direction of the rotor can also be generated, thereby forming the magnetic levitation bearing of which a hybrid bias radial magnetic force can be adjusted. The hybrid bias can play a role of reducing or even replacing the radial and axial bias currents, thereby reducing the working loss of the magnetic bearing. The present invention proposes a hybrid bias magnetic levitation bearing, which can reduce the bearing losses in double ways, and meanwhile makes the radial force adjustable, such that the design flexibility of the bearing is increased and the use range is expanded.

The permanent magnet magnetic circuit generated by the permanent magnet 6 is as shown in FIG. 1 and is indicated by "———▶———". The permanent magnet magnetic circuit passes into a second core in a radial direction from the permanent magnet 6 (one part is on the left side and the other part is on the right side). The magnetic circuit on the left side sequentially passes through the second core in the axial direction, in the radial direction and in the axial direction again, then passes through the first axial gap X2 and the thrust disc 2, and then returns to the permanent magnet 6 in the radial direction, thereby forming a complete loop-shaped permanent magnet magnetic circuit (a bias magnetic circuit). Therefore, the permanent magnet force (i.e., the bias force) is formed to the thrust disc in the axial direction. The magnetic circuit on the right side sequentially passes through the second core in the axial direction, in the radial direction, and in the axial direction again, then passes through the second axial gap X3 and the thrust disc 2, and then returns to the permanent magnet 6 in the radial direction, thereby forming a complete loop-shaped permanent magnet magnetic circuit (a bias magnetic circuit). Therefore, the permanent magnet force (i.e., the bias force) is formed to the thrust disc in the axial direction.

Generally, the cost of the magnetic levitation bearing mainly includes the structural manufacturing cost and the later operating cost thereof, wherein the later operating cost mainly depends on the magnitude of the operating current. The larger the current is, the higher the operating cost is. Therefore, designing the magnetic levitation bearing with a small working current has always been the goal pursued by the industry. The magnetic levitation bearings include active magnetic levitation bearings, permanent magnetic levitation bearings, and hybrid magnetic levitation bearings. The control force of the active magnetic levitation bearing is determined by the magnitude of a coil current only. The permanent magnetic levitation bearing has no coil current, but depends on an electromagnetic force provided by a permanent magnet. The hybrid magnetic levitation bearing combines the effects of the two former levitation bearings, and an electromagnetic force is provided by both a permanent magnet and a coil current. The hybrid bearing generally can only provide a unidirectional (axial or radial) permanent magnet bias magnetic force, and a unidirectional (axial or radial) control magnetic force.

The description provides a brand new hybrid bias magnetic levitation bearing, which can provide axial and radial bias magnetic forces, and the control magnetic force in the radial direction, and can reduce the operating current of the control coil, the bearing losses, and the operating cost.

Preferably, the second stator core comprises a front stator core 3.

The front stator core 3 comprises a first axial extending portion 31, a first radial extending portion 32, and a second axial extending portion 33.

One end of the first axial extending portion 31 is located on the radial outer side of the permanent magnet 6, and the other end of the first axial extending portion 31 extends in the axial direction of the rotor.

One end of the first radial extending portion 32 is connected to the other end of the first axial extending portion 31, and the other end of the first radial extending portion 32 extends in the radial direction of the rotor.

One end of the second axial extending portion 33 is connected to the other end of the first radial extending portion 32, the other end of the second axial extending portion 33 extends to a position close to the thrust disc 2 in the axial direction of the rotor, and the other end of the second axial extending portion 33 and the thrust disc 2 are separated by a first axial gap X2 in the axial direction of the rotor.

The above is a preferred structural form of the front stator core when the second stator core in Embodiment 1 of the magnetic levitation bearing of the present invention comprises the front stator core. The first axial extending portion 31, the first radial extending portion 32 and the second axial extending portion 33 are connected in sequence to form magnetic circuit conduction. The magnetic circuit on the permanent magnet 6 is conducted to a right end face of the second axial extending portion (as shown in FIG. 1). Further, the axial force acting on a left end face of the thrust disc is generated by the first axial gap X2 formed between the second axial extending portion and the thrust disc 2, thereby forming an axial bias force (or called as an axial permanent magnet force) in one direction.

Preferably, the second stator core comprises a rear stator core 7.

The rear stator core 7 comprises a third axial extending portion 71, a second radial extending portion 72, and a fourth axial extending portion 73.

One end of the third axial extending portion 71 is located on the radial outer side of the permanent magnet 6, and the other end of the third axial extending portion 71 extends in the axial direction of the rotor.

One end of the second radial extending portion 72 is connected to the other end of the third axial extending portion 71, and the other end of the second radial extending portion 72 extends in the radial direction of the rotor.

One end of the fourth axial extending portion 73 is connected to the other end of the second radial extending portion 72, the other end of the fourth axial extending portion 73 extends to a position close to the thrust disc 2 in the axial direction of the rotor, and the other end of the fourth axial extending portion and the thrust disc 2 are separated by a second axial gap X3 in the axial direction.

The above is a preferred structural form of the rear stator core when the second stator core in Embodiment 1 of the magnetic levitation bearing of the present invention comprises the rear stator core. The third axial extending portion 71, the second radial extending portion 72 and the fourth axial extending portion 73 are sequentially connected to form magnetic circuit conduction, and the magnetic circuit on the permanent magnet 6 is conducted to a left end face of the fourth axial extending portion (as shown in FIG. 1). Further, the axial force acting on a right end face of the thrust disc is generated by the second axial gap X3 formed between the fourth axial extending portion and the thrust disc 2, thereby an axial bias force (or called as an axial permanent magnet force) in another direction.

Embodiment 2

Figure 3:
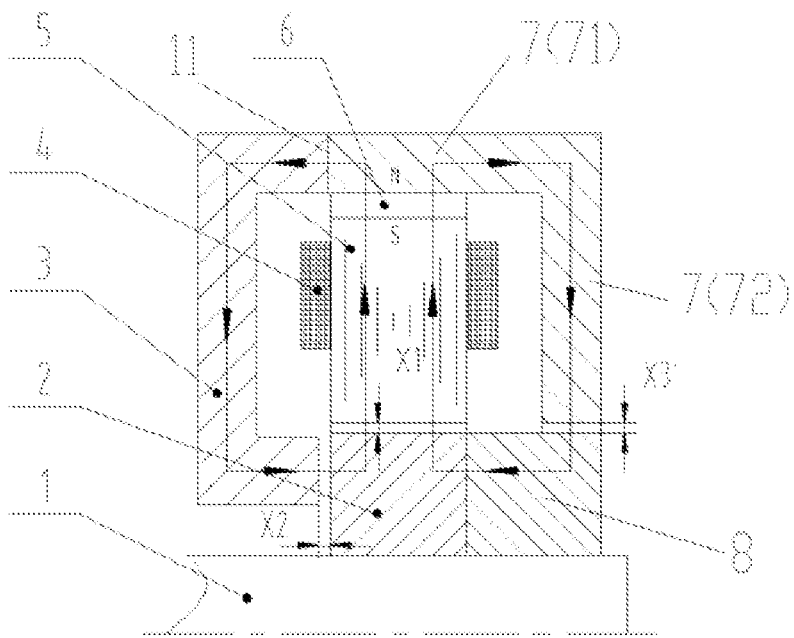
FIG. 3 is an internal structural diagram in a longitudinal section of the magnetic levitation bearing according to Embodiment 2 of the present invention.

Referring to FIGS. 3-4, in the present embodiment, only the corresponding replacement is made to the specific structure of the rear stator core in Embodiment 1, and the rest is the same as Embodiment 1.

Preferably, the second stator core comprises a rear stator core 7.

The rear stator core 7 comprises a third axial extending portion 71 and a second radial extending portion 72.

One end of the third axial extending portion 71 is located on the radial outer side of the permanent magnet 6, and the other end of the third axial extending portion 71 extends in the axial direction of the rotor.

One end of the second radial extending portion 72 is connected to the other end of the third axial extending portion 71, and the other end of the second radial extending portion 72 extends in the radial direction of the rotor.

The second stator core further comprises a rotor retaining ring 8 disposed on a position on the axial side of the thrust disc 2 and close to the second radial extending portion 72, and the rotor retaining ring 8 is fixedly connected to the rotor.

The other end of the second radial extending portion 72 extends to a position close to the rotor retaining ring 8 in the radial direction of the rotor, and the other end of the second radial extending portion 72 and the rotor retaining ring 8 are separated by a second radial gap X3' in the radial direction.

The above is a preferred structural form of the rear stator core when the second stator core in Embodiment 2 of the magnetic levitation bearing of the present invention comprises the rear stator core. The third axial extending portion 71 and the second radial extending portion 72 are sequentially connected to form magnetic circuit conduction, and the magnetic circuit on the permanent magnet 6 is conducted to the lower end face of the second radial extending portion (as shown in FIG. 3). Further, the axial force acting on the upper end face of the rotor retaining ring is generated by the second radial gap X3' formed between the second radial extending portion and the rotor retaining ring 8, thereby forming a radial electromagnetic force (or called as a radial control magnetic force) in one direction.

The general centrifugal compressor experiences a backward axial force, which is relatively large, during the operation and shutdown of the compressor. In order to weaken or even offset the adverse effect of such action force on the stability of the rotor, according to the present invention, the rotor retaining ring and the rear stator core matched therewith are disposed to eliminate the original axial force generated to the thrust disc, and instead, the radial force is generated to the rotor retaining ring, and then converted into a radial force acting on the rotor. The action of the axial force of the air gap X3 is eliminated, so that the axial force generated by the front stator core can be used to offset the axial force of the compressor. Instead, the radial force provided by the air gap X3' is applied to the centrifugal compressor, thereby further reducing the working current of the magnetic levitation bearing, reducing the losses, reducing the operating cost of the compressor, and improving the product competitiveness.

The magnetic circuit direction in Embodiment 2 is basically the same as that in Embodiment 1. The details refer to the directions of the arrow "———▶———" of the permanent magnet magnetic circuit and the arrow "———▶———" of the electromagnetic magnetic circuit in FIGS. 3-4. That is, the electromagnetic magnetic circuit generated by the radial control coil is as shown in FIG. 4 and is indicated by "———▶———". The electromagnetic magnetic circuit surrounds the coil from the radial outer side of the coil, passes through the radial stator core in the radial direction, then passes through the first radial gap X1 and then passes into the thrust disc 2 in the radial direction. After circumferentially surrounding for a part of arc length in the thrust disc 2, the electromagnetic magnetic circuit passes through the first radial gap X1 in the radial direction and into the radial stator core 5. Therefore, the loop-shaped electromagnetic magnetic circuit (two loops) as shown in FIG. 2 is formed, thereby forming an electromagnetic force (i.e., a control force) to the thrust disc in the radial direction.

The permanent magnet magnetic circuit generated by the permanent magnet 6 is as shown in FIG. 3 and is indicated by "———▶———". The permanent magnet magnetic circuit passes into the second core in the radial direction from the permanent magnet 6 (one part is on the left side and the other part is on the right side). The magnetic circuit on the left side sequentially passes through the second core in the axial direction, in the radial direction, and in the axial direction, then passes through the first axial gap X2 and the thrust disc 2, and then returns to the permanent magnet 6 in the radial direction to form a complete loop-shaped permanent magnet magnetic circuit (a bias magnetic circuit), thereby forming a permanent magnet force (i.e., a bias force) to the thrust disc in the axial direction. The magnetic circuit on the right side sequentially passes through the second core in the axial direction and in the radial direction, passes through the second radial gap X3' in the radial direction and into the rotor retaining ring 8, then passes through the rotor retaining ring in the axial direction, into the thrust disc 2, and then returns to the permanent magnet 6 in the radial direction to form a complete loop-shaped permanent magnet magnetic circuit (a bias magnetic circuit), thereby forming a permanent magnetic force (i.e., a bias force) to the thrust disc in the axial direction.

Preferably, when the magnetic levitation bearing comprises both the front stator core 3 and the rear stator core 7, the front stator core 3 is connected to the rear stator core 7 at a position on the radial outer side of the permanent magnet 6, so that the magnetic field can be continuously conducted in the connection position. One end, opposite to the rear stator core 7, of the rear stator core 7 on the radial outer side is connected to one end, opposite to the front stator core 3, of the rear stator core 7 on the radial outer side.

By connecting the front stator core and the rear stator core, the magnetic field can be conducted at the connection position 11, thereby ensuring that the generated permanent magnet force cannot be weakened.

Preferably, the connection position 11 is located on the radial outer side of the permanent magnet 6 and is opposite to an axial end face of the permanent magnet 6 in the axial direction of the rotor. FIGS. 1 and 3 show a preferred disposing position of the connection position between the front stator core and the rear stator core in the magnetic levitation bearing of the present invention, thereby effectively ensuring favorable connection between the front stator core and the rear stator core, and further ensuring the normal magnetic flux conduction.

The present invention proposes a brand new hybrid bias magnetic levitation bearing, which can provide axial and radial bias magnetic forces and the radial control magnetic force, and can reduce the operating current of the control coil, the bearing losses and the operating cost. Meanwhile, the optimized bearing structure (as shown in FIG. 3) can provide a large axial bias magnetic force to weaken or even reduce the influence of aerodynamic forces on the rotor, reduce a working current of an axial magnetic levitation bearing of a magnetic levitation system, and reduce the operating cost of a magnetic levitation centrifugal machine.

1. The hybrid bias magnetic levitation bearing structure is provided to provide the axial and radial bias magnetic forces and the radial control magnetic force. The bearing losses and the operating cost of the magnetic levitation bearing are reduced.

2. The hybrid bias magnetic levitation bearing structure suitable for a centrifugal compressor is provided to provide a large axial bias force to offset an axial aerodynamic force. The working current of the axial magnetic levitation bearing of the magnetic levitation system is reduced, thereby reducing the bearing losses and the operating cost of the bearing.

X1 is a radial gap formed by the inner circle of the radial stator core 5 and the outer circle of the thrust disc 2, to provide a radial bias force and a control magnetic force. X2 is formed by the right end face having a small diameter of the front stator core 3 and the left end face of the thrust disc 2, to provide a leftward axial bias force as shown in the drawings. X3 is formed by the left end face having a small diameter of the rear stator core 7 and the right end face of the thrust disc 2, to provide a rightward axial bias force shown in FIG. 1. X3' is formed by the inner circular surface of the rear stator core 7 and the outer circular surface of the rotor retaining ring 8, to provide a radial bias force.

For each gap:

X1 is a radial gap formed by the inner circle of the radial stator core 5 and the outer circle of the thrust disc 2, to provide a radial bias force and a control magnetic force.

X2 is formed by the right end face having a small diameter of the front stator core 3 and the left end face of the thrust disc 2, to provide a leftward axial bias force as shown in the drawings.

X3 is formed by the left end face having a small diameter of the rear stator core 7 and the right end face of the thrust disc 2, to provide a rightward axial bias force shown in the drawings.

X3' is formed by the inner circular surface of the rear stator core 7' and the outer circular surface of the rotor retaining ring 8, to provide a radial bias force.

Implementing Manner 1 (Embodiment 1)

As shown in FIGS. 1-2, after the assembly relationship is completed according to the positions shown in the drawings, the permanent magnet 6 provides a radial permanent magnet bias magnetic force $\vec{F}_{1p}$ by the air gap X1, and axial bias magnetic forces $\vec{F}_{2p}$ and $\vec{F}_{3p}$ by the air gaps X2 and X3 respectively. During operation, when the radial control coil 4 is energized, the radial control magnetic force $\vec{F}_{1e}$ is provided by the air gap X1.

Therefore, the radial force that can be provided by the present implementing manner is:

$$\vec{F}_r = \vec{F}_{1p} + \vec{F}_{1e}.$$

Therefore, the axial force that can be provided by the present implementing manner is:

$$\vec{F}_a = \vec{F}_{2p} + \vec{F}_{3p}.$$

It can be seen that the hybrid bias magnetic levitation bearing can provide the permanent magnet bias axial force, a part of the permanent magnet bias radial force and the controllable electromagnetic radial force, so that the bearing can provide the controllable radial force while reducing the axial and radial currents, thereby playing the role of active levitation.

Implementing Manner 2 (Embodiment 2)

As shown in FIGS. 3-4, after the assembly relationship is completed according to the positions shown in the figures, the permanent magnet 6 provides a radial permanent magnet bias magnetic force $\vec{F}_{1p}$ by the air gap X1, an axial bias magnetic force $\vec{F}_{2p}$ by the air gap X2, and a radial bias magnetic force $\vec{F}_{3p}$ by the air gap X3'. During operation, after the radial control coil 4 is energized, the radial control magnetic force $\vec{F}_{1e}$ can be provided by the air gap X1.

Therefore, the radial force that can be provided by the present implementing manner is:

$$\vec{F}_r = \vec{F}_{1p} + \vec{F}_{1e} + \vec{F}_{3p}.$$

Therefore, the axial force that can be provided by the present implementing manner is:

$$\vec{F}_a = \vec{F}_{2p}.$$

It can be seen that the hybrid bias magnetic levitation bearing can provide a relatively large permanent magnetic bias axial force, which can offset an axial force applied to the rotor by a pneumatic component (such as an impeller and a diffuser) in the magnetic levitation centrifugal compressor, and reduce an axial load during the operation of the rotor. In addition, a part of the permanent magnet bias radial force and the controllable electromagnetic radial force can be provided. In such implementing manner, two air gaps (X1 and X3') in the radial direction provide the radial bias force, thereby further reducing the current of the radial control coil during operation. Therefore, the controllable radial force can be provided while the axial and radial currents are further reduced, and the effect of active levitation is achieved.

The present invention also provides a magnetic levitation rotor support assembly, which comprises a rotor and any one of the preceding magnetic levitation bearings which can support the rotor.

Due to the inclusion of the above magnetic levitation bearing, the controllable and adjustable radial electromagnetic force to the thrust disc can be generated in the radial direction of the rotor, the flexibility of the bearing can be designed to be larger, and the application range of the bearing is effectively expanded. Different from the axial force adjustment in the prior art, the radial force applied on the bearing can be adjusted, so the magnetic levitation bearing can be applied to more horizontal turbine machinery, thereby expanding the application range of such type of bearings.

Since the general centrifugal compressor will experience a backward axial force, which is relatively large, during the operation and shutdown of the compressor, in order to weaken or even offset the adverse effect of such action force on the stability of the rotor, by disposing the rotor retaining ring and the rear stator core matched therewith, the original axial force generated to the thrust disc can be eliminated, and instead, a radial force to the rotor retaining ring is generated, and then converted into a radial force acting on the rotor. The action of the axial force of the air gap X3 is eliminated, so that the axial force generated by the front stator core can be used to offset the axial force of the compressor. Instead, the radial force provided by the air gap X3' is applied to the centrifugal compressor, thereby further reducing the working current of the magnetic levitation bearing, reducing the losses, reducing the operating cost of the compressor, and improving the product competitiveness.

Preferably, the rotor comprises a smooth shaft 1 and a thrust disc 2 fixedly connected to the radial outer side of the smooth shaft 1. An axial and/or radial magnetic force can be generated between the magnetic levitation bearing and the thrust disc 2 to support the rotor. The above is a preferred structural form of the rotor in the present invention. By means of the interaction between the magnetic levitation bearing and the thrust disc in the present invention, the magnetic action to the thrust disc in the axial and/or radial direction is generated to form magnetic levitation. Particularly, the adjustable electromagnetic force to the thrust disc is generated in the radial direction, so that the radial direction of the rotor can be adjusted, thereby expanding the application range of the bearing. Therefore, the bearing can be applied to more centrifugal compressors (horizontal turbine machinery).

The present invention also provides a compressor, comprising any one of the preceding magnetic levitation rotor support assemblies, preferably, a centrifugal compressor. Due to the inclusion of the above magnetic levitation rotor support assembly, the controllable and adjustable radial electromagnetic force to the thrust disc can be generated in the radial direction of the rotor, the flexibility of the bearing can be designed to be larger, and the application range of the bearing is effectively expanded. Different from the axial force adjustment in the prior art, the radial force of the bearing can be adjusted, so the magnetic levitation bearing can be applied to more horizontal turbine machinery, thereby expanding the application range of such type of bearings.

By disposing the rotor retaining ring and the rear stator core matched therewith, the original axial force generated to the thrust disc can be eliminated, and instead, a radial force to the rotor retaining ring is generated, and then converted into a radial force acting on the rotor. The action of the axial force of the air gap X3 is canceled, so that the axial force generated by the front stator core can be used to offset the axial force of the compressor. Instead, the radial force provided by the air gap X3' is applied to the centrifugal compressor, thereby further reducing the working current of the magnetic levitation bearing, reducing the losses, reducing the operating cost of the compressor, and improving the product competitiveness.

The foregoing is only the preferred embodiments of the present invention and is not intended to limit the present invention. Any modifications, equivalent replacements and improvements and the like made within the spirit and principle of the present invention shall be included in the protection scope of the present invention. The foregoing is only preferred embodiments of the present invention. It should be noted that, for those of ordinary skill in the art, several improvements and modifications can also be made without departing from the technical principles of the present invention. These improvements and modifications should also be regarded as the protection scope of the present invention.

The invention claimed is:

1. A magnetic levitation bearing for supporting a rotor by interacting with a thrust disc on the rotor, comprising:
   a radial stator core having an annular structure, disposed on a radial outer side of a thrust disc and corresponding to the thrust disc in an axial direction of the rotor, the radial stator core and the thrust disc being separated by a first radial gap X1;
   a radial control coil, disposed on the radial stator core and being capable of generating a radial electromagnetic force to the thrust disc in a radial direction of the rotor;
   a permanent magnet, disposed on the radial outer side of the radial stator core and corresponding to a position of the radial stator core in the axial direction; and
   a second stator core, being capable of extending from a radial outer side of the permanent magnet to a position close to the thrust disc such that a permanent magnet force in the axial direction of the rotor and/or in the radial direction of the rotor is generated to the thrust disc;
   wherein:
   the second stator core comprises a rear stator core;
   the rear stator core comprises a third axial extending portion and a second radial extending portion,
   one end of the third axial extending portion is located on the radial outer side of the permanent magnet, and the other end of the third axial extending portion extends in the axial direction of the rotor;
   one end of the second radial extending portion is connected to the other end of the third axial extending portion, and the other end of the second radial extending portion extends in the radial direction of the rotor;
   the second stator core further comprises a rotor retaining ring disposed on a position on the axial side of the thrust disc and close to the second radial extending portion, wherein the rotor retaining ring is fixedly connected to the rotor; and
   the other end of the second radial extending portion extends toward a position close to the rotor retaining ring in the radial direction of the rotor, and the other end of the second radial extending portion and the rotor retaining ring are separated by a second radial gap X3' in the radial direction.

2. The magnetic levitation bearing according to claim 1, further comprising:
   more than two through grooves, formed on the radial stator core and located in a position between a radial inner side and a radial outer side of the radial stator core, the through grooves passing through the radial stator core in the axial direction, every two adjacent through grooves forming a through groove pair, and a magnetic pole to be wound by the radial control coil being formed between the two through grooves in one of the through groove pairs.

3. The magnetic levitation bearing according to claim 2, wherein the two adjacent through grooves in one of the through groove pairs are arranged in a circumferential direction of the radial stator core such that a length direction of the magnetic pole extends toward a radial direction of the radial stator core; and the radial control coil is wound around the magnetic pole such that a surrounding axis of the radial control coil is in the radial direction of the radial stator core.

4. The magnetic levitation bearing according to claim 2, wherein a plurality of the magnetic poles are disposed and evenly distributed in the circumferential direction of the radial stator core, and each magnetic pole is wound by one radial control coil.

5. The magnetic levitation bearing according to claim 4, wherein four magnetic poles are disposed, and every two adjacent magnetic poles are separated by a circumferential angle of 90° in the circumferential direction of the radial stator core.

6. The magnetic levitation bearing according to claim 1, wherein the second stator core comprises a front stator core:
   the front stator core comprises a first axial extending portion, a first radial extending portion, and a second axial extending portion;
   one end of the first axial extending portion is located on the radial outer side of the permanent magnet, and the other end of the first axial extending portion extends in the axial direction of the rotor;
   one end of the first radial extending portion is connected to the other end of the first axial extending portion, and the other end of the first radial extending portion extends in the radial direction of the rotor; and
   one end of the second axial extending portion is connected to the other end of the first radial extending portion, the other end of the second axial extending portion extends toward a position close to the thrust disc in the axial direction of the rotor, and the other end of the second axial extending portion and the thrust disc are separated by a first axial gap X2 in the axial direction of the rotor.

7. The magnetic levitation bearing according to claim 1, wherein:
   the rear stator core further comprises a fourth axial extending portion;
   and
   one end of the fourth axial extending portion is connected to the other end of the second radial extending portion, the other end of the fourth axial extending portion extends to a position close to the thrust disc in the axial direction of the rotor, and the other end of the fourth axial extending portion and the thrust disc are separated by a second axial gap X3 in the axial direction.

8. The magnetic levitation bearing according to claim 7, wherein when the magnetic levitation bearing comprises both the front stator core and the rear stator core, the front stator core is connected to the rear stator core at a position on the radial outer side of the permanent magnet such that magnetic field can be continuously conducted at the connection position.

9. The magnetic levitation bearing according to claim 8, wherein the connection position is located radially outward from the permanent magnet, and axially outward from an axial end face of the permanent magnet in the axial direction of the rotor.

10. A magnetic levitation rotor support assembly, comprising:
    a rotor and the magnetic levitation bearing according to claim 1, wherein the magnetic levitation bearing can support the rotor.

11. The magnetic levitation rotor support assembly according to claim 10, wherein the rotor comprises a smooth shaft and a thrust disc fixedly connected to a radial outer side of the smooth shaft, and an axial and/or radial magnetic force can be generated between the magnetic levitation bearing and the thrust disc to support the rotor.

12. A compressor, comprising the magnetic levitation rotor support assembly according to claim 11.

13. A compressor, comprising the magnetic levitation rotor support assembly according to claim 10.

* * * * *